US010619775B2

(12) United States Patent
O'Connor et al.

(10) Patent No.: US 10,619,775 B2
(45) Date of Patent: Apr. 14, 2020

(54) MULTI-AXIS ROTATABLE COUPLING ELEMENT FOR A HOSE OR PIPE

(71) Applicant: Swan Products LLC, Sandy Springs, GA (US)

(72) Inventors: Timothy O'Connor, Eden, NY (US); Steven Lorraine, Glastonbury, CT (US)

(73) Assignee: Swan Products, LLC, Sandy Springs, GA (US)

( * ) Notice: Subject to any disclaimer, the term of this patent is extended or adjusted under 35 U.S.C. 154(b) by 0 days.

(21) Appl. No.: 16/076,773

(22) PCT Filed: May 3, 2017

(86) PCT No.: PCT/US2017/030779
§ 371 (c)(1),
(2) Date: Aug. 9, 2018

(87) PCT Pub. No.: WO2017/192681
PCT Pub. Date: Nov. 9, 2017

(65) Prior Publication Data
US 2019/0049046 A1 Feb. 14, 2019

Related U.S. Application Data

(63) Continuation of application No. 15/146,569, filed on May 4, 2016, now abandoned.

(51) Int. Cl.
*F16L 27/00* (2006.01)
*F16L 27/12* (2006.01)
(Continued)

(52) U.S. Cl.
CPC ........... *F16L 27/125* (2013.01); *F16L 15/006* (2013.01); *F16L 27/0849* (2013.01)

(58) Field of Classification Search
CPC .... F16L 27/125; F16L 15/006; F16L 27/0849
(Continued)

(56) References Cited

U.S. PATENT DOCUMENTS

| 6,257,505 B1 | 7/2001 | Wang et al. |
| 2006/0118184 A1 | 6/2006 | Mikiya et al. |

(Continued)

FOREIGN PATENT DOCUMENTS

| CH | 506014 A | * | 4/1971 |
| CN | 1467400 A | | 1/2004 |

(Continued)

OTHER PUBLICATIONS

Int'l. Search Report and Written Opinion dated Aug. 10, 2017 in Int'l. Application No. PCT/US17/30779.
(Continued)

*Primary Examiner* — David Bochna
*Assistant Examiner* — James A Linford
(74) *Attorney, Agent, or Firm* — Polsinelli, PC (57) ABSTRACT

A multi-axis rotatable coupling element for a hose or pipe comprising a rotation assembly coupled between a female fitting and a male fitting. The female fitting has a first female threaded end connector for attachment to a hose or spigot, and a second end connector. The male fitting has a third male threaded end for attachment to a hose or spigot, and a fourth end connector. The rotation assembly consists of a first and second rotation member and a single continuous internal channel. The first and second rotation member are rotatable about a first and second axis of rotation, respectively, and have a first and second longitudinal bore for conveying fluid, respectively. The first and second axes of rotation may be different. The single continuous internal channel comprises at least the first and second longitudinal bore and conveys a fluid between the female fitting and the male fitting.

17 Claims, 8 Drawing Sheets

(51) Int. Cl.
  *F16L 27/08* (2006.01)
  *F16L 15/00* (2006.01)
(58) Field of Classification Search
  USPC .................................................. 285/272, 281
  See application file for complete search history.

(56) References Cited

U.S. PATENT DOCUMENTS

| | | |
|---|---|---|
| 2012/0248762 A1 | 10/2012 | Weinhandl et al. |
| 2014/0261837 A1 | 9/2014 | van der Meijden et al. |

FOREIGN PATENT DOCUMENTS

| | | | |
|---|---|---|---|
| DE | 1944047 A1 | * | 3/1970 |
| DE | 202005015983 U1 | | 3/2006 |
| DE | 202011105883 U1 | * | 12/2011 |
| EP | 1672265 A1 | | 6/2006 |
| GB | 1196252 A | * | 6/1970 |
| WO | 2013146989 A1 | | 10/2013 |

OTHER PUBLICATIONS

Int'l Preliminary Report on Patentability dated Mar. 29, 2018 in Int'l Application No. PCT/US17/30779.
Office Action; Chinese Application No. 201780011316.2; dated Aug. 12, 2019.
English abstract of CN1467400; retrieved from www.espacenet.com on Aug. 28, 2019.
English translation of Chinese Office for Application No. 201780011316.2; dated Aug. 12, 2019.

* cited by examiner

MULTI-AXIS ROTATABLE COUPLING ELEMENT FOR A HOSE OR PIPE

BACKGROUND

1. Technical Field

The present invention is in the field of pipe and hose coupling elements, and more specifically in the field of pipe and hose coupling elements adapted to convey pressurized fluids.

2. Introduction

Coupling elements are often used to connect pipes or hoses to a fluid source, pressurized or otherwise, and may help ensure a tight and leak-free seal between the two components. A number of coupling elements are known in the art, ranging from the ubiquitous male-female threaded pair to far more specialized constructions for unique or high-performance applications. A vast majority of these coupling elements share a common feature, in that they provide no rotational degrees of freedom—utilizing a rigid or otherwise fixed connection between the pipe or hose and the fluid source as a byproduct of their relatively simple design. In such configurations, it can be difficult and frustrating to move or otherwise reposition a pipe or hose once it is connected to the fluid source, as the lack of rotational freedom leads to kinking, tangling, flow restriction, or even damage to the pipe or hose. This kinking is exacerbated by the use of a flexible pipe or hose and by frequent movement and repositioning of the pipe or hose, both of which are commonly found, for example, in garden, agricultural, marine, or other watering and fluid transmission operations.

Some coupling elements may permit rotational freedom, for example using a ball and socket joint to permit a pipe or hose to pivot relative to a fluid source. However, this rotational freedom is achieved at the cost of a reduced flow rate, which is an undesirable characteristic. Other coupling elements may make use of more complex designs to permit rotational freedom, relying on multiple internal channels to re-route the fluid flow depending on the different rotational configurations available. These coupling elements that utilize discontinuous fluid flow channels are mechanically complex and prone to breaking, jamming, clogging, or otherwise reducing flow performance, all of which are undesirable characteristics.

As such, there is an ongoing need for a coupling element with one or more degrees of rotational freedom that is further adapted to convey a pressurized fluid through a single continuous internal channel without a reduction in flow rate relative to that of the fluid source.

SUMMARY OF THE INVENTION

A hose coupler is provided in accordance with one embodiment of the invention. The hose coupler comprises: a female fitting having a first end connector and a second end connector, wherein the first end connector is a female threaded end connector for attachment to a hose or a spigot; a male fitting having a third end connector and a fourth end connector, wherein the third end connector is a male threaded end connector for attachment to a hose or a spigot; and a rotation assembly coupled between the female fitting and the male fitting. The rotation assembly comprises a first rotation member rotatable about a first axis of rotation and having a first longitudinal bore for conveying a fluid; a second rotation member rotatable about a second axis of rotation that is different from the first axis of rotation and having a second longitudinal bore for conveying a fluid; and a single continuous internal channel for conveying a fluid between the female fitting and the male fitting, wherein the internal channel comprises at least the first longitudinal bore and the second longitudinal bore.

In one embodiment, the first axis of rotation is perpendicular to the second axis of rotation.

In one embodiment, the first rotation member is rotatable 180 degrees about the first axis of rotation.

In one embodiment, the first rotation member comprises an upper half coupled to the female fitting and a lower half coupled to the male fitting.

In one embodiment, the second rotation member is rotatable 360 degrees about the second axis of rotation.

In one embodiment, the second rotation member comprises a rotatable coupling between the lower half of the first rotation member and a one of the second end connector and the fourth end connector.

In one embodiment, the internal diameter of the single continuous internal channel is between 0.4 inches and 0.6 inches.

In one embodiment, the internal diameter of the first longitudinal bore is equal to the internal diameter of the second longitudinal bore.

In one embodiment, the first rotation member and second rotation member both contain at least one O-ring, wherein a diameter of the O-ring is larger than an internal diameter of one or more of the first longitudinal bore or the second longitudinal bore and is oriented perpendicular to the respective first or second axis of rotation.

In one embodiment, the first axis of rotation is parallel to the first longitudinal bore for conveying a fluid.

In one embodiment, the second axis of rotation is parallel to the second longitudinal bore for conveying a fluid.

In one embodiment, the single continuous internal channel comprises a fluid connection between the female fitting, the second rotation member, the first rotation member, and the male fitting.

In one embodiment, the hose coupler further comprises a flow control switch, the flow control switch being actuatable to control the flow of fluid through the single continuous internal channel.

In one embodiment, the flow control switch comprises a rotary element rotatable about a third axis of rotation.

In one embodiment, the flow control switch is coupled to the rotation assembly.

In one embodiment, the flow control switch further comprises a flow gate disposed within the single continuous internal channel, such that actuation of the flow control switch causes the flow gate to selectively occlude the single continuous internal channel.

In one embodiment, the rotary element is rotatable between an on position and an off position, the on position designating a maximal flow of fluid through the single continuous internal channel and the off position designating a minimal flow of fluid through the single continuous internal channel.

In one embodiment, the rate of fluid flow through the single continuous internal channel is substantially proportional to the degree of rotation of the rotary element between the on and off positions.

In one embodiment, the third axis of rotation is parallel to the second axis of rotation.

BRIEF DESCRIPTION OF THE DRAWINGS

In order to describe the manner in which the above-recited and other advantages and features of the disclosure can be obtained, a more particular description of the principles briefly described above will be rendered by reference to the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various elements of the disclosure are discussed in detail below. While specific implementations are discussed, it should be understood that this is done for illustration purposes only. A person skilled in the relevant art will recognize that other components and configurations may be used without parting from the scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the present disclosure. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Figure 1:
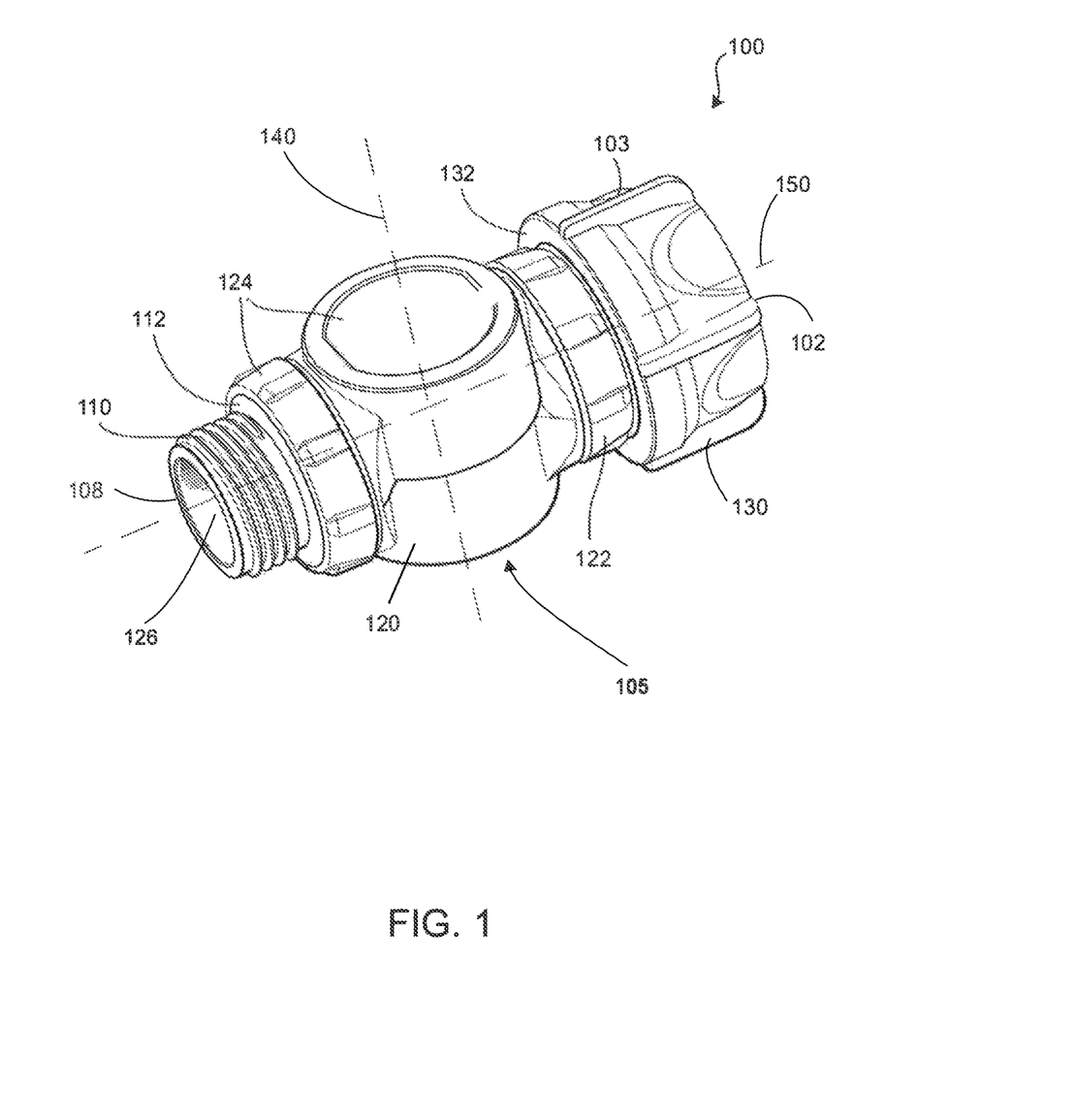
FIG. 1 is a perspective view of an assembled pipe or hose coupling element according to one embodiment of the present disclosure.

FIG. 1 illustrates an exemplary pipe or hose coupling element 100 of the present disclosure. Throughout the following description, reference may be made to a "hose" or a "pipe", with it being understood that the terms are used interchangeably. The multi-component coupling element 100 may be constructed from one or more different materials—each of its constituent components may be constructed from a number of suitable materials, including but not limited to, plastics such as polyethylene, nylon, PVC, polypropylene and metals such as brass and stainless steel, or any other such suitable materials as would be appreciated by one of ordinary skill in the art. The choice of a specific material may be driven by parameters such as cost, durability, weather resistance, pressure requirements, or any other such parameters.

Coupling element 100 consists of a female fitting 102 provided at a first end, a male fitting 108 provided at a second end, and a rotation assembly 105 coupled between female fitting 102 and male fitting 108. Rotation assembly 105, as illustrated, comprises a first rotation member 120 and a second rotation member 130, and provides two degrees of rotational freedom, as will be subsequently explained in greater detail.

Although coupling element 100 is illustrated with female fitting 102 and male fitting 108, in some embodiments coupling element 100 may be adapted to provide two female fittings, or two male fittings, as is required by the end thread geometry of a fluid source or a hose to which coupling element 100 will be connected. Additional coupling elements, such as a male-to-female adapter or a female-to-male adapter, may be used in conjunction with coupling element 100 without departing from the scope of the present disclosure.

In general operation, coupling element 100 may be coupled between a hose and a fluid source, wherein the fluid source is generally pressurized, although coupling element 100 is equally suitable for use with a non-pressurized fluid source. In some embodiments, a fluid source may be provided by a tap or spigot such as those commonly found in most residential and commercial buildings for providing pressurized water (e.g. often at a pressure in the range of 3-30 psi). In some embodiments, a fluid source may be provided by a hose or pipe. Female fitting 102 can consist of a first end connector 104 and a second end connector 106 (obscured, see FIG. 2), wherein first end connector 104 and second end connector 106 are disposed at opposing openings or ends of female fitting 102. In some embodiments, female fitting 102 may further comprise a protective cover 103. A central longitudinal bore 216 (in FIG. 2 aligned with a central longitudinal axis 150) for conveying fluids runs the entire length of female fitting 102 and provides continuous fluid communication through rotation assembly 105, and between female fitting 102 and male fitting 108. In some embodiments, the central longitudinal bore 216 may be defined between first end connector 104 and second end connector 106. First end connector 104 may be provided with female threads 310 (in FIG. 3), such that it can receive and couple to a correspondingly sized male connector of a hose or fluid source, for example, and second end connector 106 may be used to couple female fitting 102 to rotation assembly 105. Protective cover 103 may be sized such that it encloses at least a portion of first end connector 104 and second end connector 106, simultaneously preventing dust or foreign particles from entering rotation assembly 105 and providing an increased hand-held grip surface area for a user of coupling element 100. Protective cover 103 may be rigidly attached such that no relative movement is possible between any of the constituent components of female fitting 102.

Male fitting 108 consists of a third end connector 110 and a fourth end connector 112, disposed at opposing openings or ends of male fitting 108. A central longitudinal bore 126 for conveying fluids is aligned along a central longitudinal axis 150b, and runs the entire length of male fitting 108. Longitudinal bore 126 can provide continuous fluid communication through rotation assembly 105, and between female fitting 102 and male fitting 108. In this embodiment, a single continuous internal channel runs through the entire length of coupling element 100 from end connector 104 to end connector 110. The single continuous internal channel of coupling element 100 consists of multiple circular longitudinal bores, although it is understood that other geometries may be employed without departing form the scope of the present disclosure. As illustrated, third end connector 110 is provided with male threads and fourth end connector 112 is used to attach male fitting 108 to rotation assembly 105. In some embodiments, male fitting 108 may have the same internal bore diameter as female fitting 102, and in some embodiments, male fitting 108 may have a larger or smaller internal bore diameter compared to female fitting 102.

As mentioned previously, a rotation assembly 105 comprising first rotation member 120 and second rotation member 130 is coupled between female fitting 102 and male fitting 108, and, as illustrated, provides two degrees of rotational freedom. First rotation member 120 comprises a lower half 122 rotatably coupled to an upper half 124, and provides a first degree of rotational freedom about a first axis of rotation 140, where axis 140 is perpendicular (transverse) to each of axis 150 and axis 150b. Lower half 122 and upper half 124 may be substantially similarly sized, with respect to one or more of length, width, and height. In some embodiments, these dimensions may not be similarly sized, such that one of lower half 122 and upper half 124 is larger than the other, for purposes such as identifying a default orientation of coupling element 100. Lower half 122 and upper half 124 may share a common central longitudinal axis, namely the first axis of rotation 140. In some embodiments, first axis of rotation 140 is situated at a central point of, and oriented substantially perpendicular to, one or more of a flat, circular face of upper half 124 and a flat, circular face of lower half 122. In operation, first rotation member 120 can permit the continuous relative rotation between lower half 122 (and all components to which it is rigidly coupled along first axis of rotation 140) and upper half 124 (and all components to which it is rigidly coupled along first axis of rotation 140), wherein the phrase 'all coupled components' is understood to include both the constituent components of coupling element 100 and any external components connected to the coupling element such as hoses, fluid sources, and adapters. For example, first rotation member 120 can permit the continuous relative rotation between a first group of coupled components, comprising lower half 122, female fitting 102, and a hose or a fluid source, and a second group of coupled components, comprising upper half 124, male fitting 108, and a hose or a fluid source. The motive force compelling a rotation of first rotation member 120 is generally provided by an external source, such as a user of coupling element 100. In some embodiments, first rotation member 120 permits a limited amount of relative rotation between lower half 122 and upper half 124 and their respectively coupled components—for example, the range of rotation may be restricted to 180 degrees.

As illustrated, second rotation member 130 comprises a rotatable coupling 132 between lower half 122 and female fitting 102, with rotatable coupling 132 herein simply indicating the interface between lower half 122 and female fitting 102. In some embodiments, rotatable coupling 132 may be provided as its own distinct component, separate from one or more of lower half 122 and female fitting 102. In some embodiments, rotatable coupling 132 can be comprised of a portion of one or more of lower half 122 and female fitting, such that rotatable coupling 132 does not provide any distinct components to coupling element 100.

As may be appreciated from visual inspection of FIG. 1, second rotation member 130 provides a second degree of rotational freedom about a second axis of rotation 150. As illustrated, second axis of rotation 150 passes through a central point of the central longitudinal bore 216 (in FIG. 2) of female fitting 102. In this embodiment, the second axis of rotation 150 is substantially parallel to central longitudinal bore 216. In the illustrated configuration of FIG. 1, second axis of rotation 150 is coaxial with the central longitudinal bore 126 and central axis 150b of male fitting 108, although it is understood that this condition is dependent upon the rotational configuration of the previously described first rotation member 120. First axis of rotation 140 and second axis of rotation 150 may be different and oriented in distinct directions. In some embodiments, first axis of rotation 140 and second axis of rotation 150 are oriented perpendicular to one another, as illustrated, such that coupling element 100 is able to achieve two degrees of rotational freedom.

In operation, second rotation member 130 permits continuous relative rotation between lower half 122 (and all components to which it is rigidly coupled along second axis of rotation 150) and female half 102 (and all components to which it is rigidly coupled along second axis of rotation 150), wherein all coupled components is understood to include both the constituent components of coupling element 100 and any external components connected to the coupling element such as hoses, fluid sources, and adapters. For example, second rotation member 130 can permit the continuous relative rotation between a first group of coupled components, comprising lower half 122, upper half 124, male fitting 108, and a hose or a fluid source, and a second group of coupled components, comprising female fitting 102 and a hose or a fluid source. In some embodiments, second rotation member 130 can permit an unlimited amount of relative rotation between lower half 122 and female fitting 102 and their respectively coupled components.

While the description above has made reference to first rotation member 120 and second rotation member 130 separately, it is understood that in operation, first rotation member 120 and second rotation member 130 may be adjusted simultaneously, without any adverse effect such as flow restriction. That is, coupling element 100 is configured to provide two simultaneous degrees of rotational freedom, rather than requiring a stepwise adjustment of only a single degree of rotational freedom at any given moment. As such, coupling element 100 is able to more robustly provide dynamic adjustment and repositioning when coupled between a hose and a fluid source, thereby serving to quickly and more effectively reduce or eliminate any kinking or twisting stresses induced in the hose. Furthermore, because both first rotation member 120 and second rotation member 130 can provide a continuous, rather than discrete and pre-defined, degree of rotation, coupling element 100 is able to offer a vastly larger number of positioning configurations between a hose and a fluid source.

Figure 2:
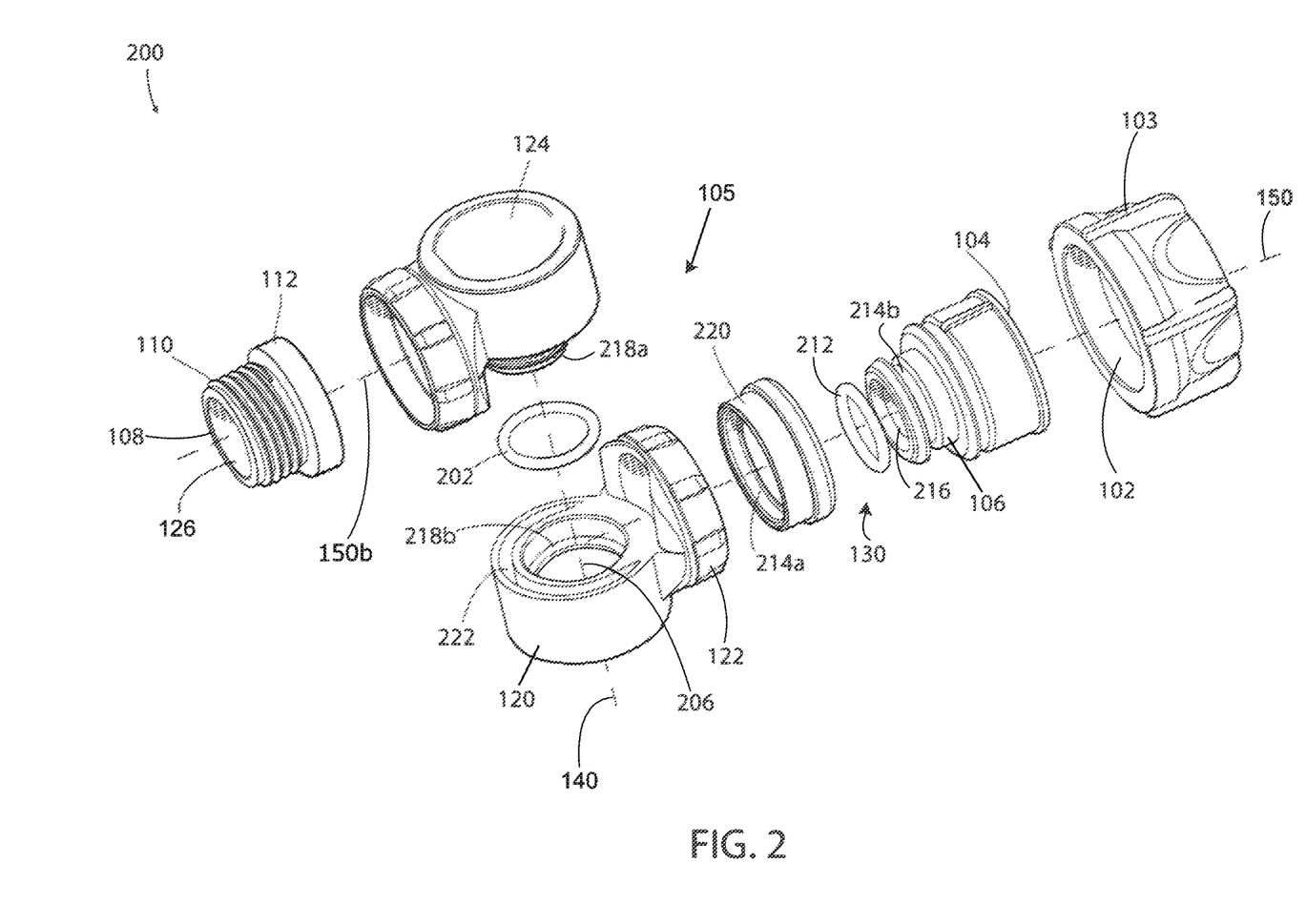
FIG. 2 is an exploded perspective view of the components of the coupling element of FIG. 1.

FIG. 2 depicts an exploded view 200 of the unassembled components of the coupling element 100, wherein it is understood that the preceding description and functionality may apply equally to exploded view 200. While FIG. 2 depicts a certain separation of distinct components of exemplary hose coupling element 100, other embodiments are possible that combine or divide one or more of the illustrated components. For example, as illustrated, male fitting 108 and upper half 124 of the first rotation member are depicted as two separate and distinct components that are rigidly attached, for example, at fourth end connector 112 via a press fit or application of an adhesive—but in some embodiments, male fitting 108 and upper half 124 of the first rotation member may be provided as a single, continuous piece of material without departing from the scope of the present disclosure. A number of other components may similarly be combined or divided, and the present disclosure is not limited to the specific manifestation of each and every illustrated component. However, providing male fitting 108 and female fitting 102 as separate and distinct components confers the advantage of modularity, allowing a hose coupling element of the present disclosure to easily and quickly be provided with, for example, two female fittings or two male fittings rather than one of each, as discussed previously.

Returning to exploded view 200, additional details underlying the internal construction and operation of rotation assembly 105 are provided. A first O-ring 202 is provided between lower half 122 and upper half 124 of first rotation member 120, such that O-ring 202 enables the smooth and continuous relative rotation between lower half 122 and upper half 124 as previously described. In some embodiments, O-ring 202 can be provided at an interface between lower half 122 and upper half 124, or O-ring 202 may be substantially contained within one of lower half 122 and upper half 124. As illustrated, O-ring 202 is contained within lower half 122, compressed between a sealing member 218a of upper half 124 and a receiving groove 218b of lower half 122, wherein sealing member 218a and receiving ledge 218b can be configured to substantially isolate O-ring 202 from any fluids that may be transmitted through coupling element 100—particularly advantageous in the presence of corrosive or otherwise damaging fluids, although it is understood that a variety of different configurations may be employed to secure and retain O-ring 202 such that it may enable the smooth and continuous rotation of first rotation member 120. This radial compression design isolates O-ring 202 from any compressive forces that may arise during the rotation of first rotation member 120—in other words, ensuring that O-ring 202 does not experience any tightening action or effect as a result of the rotation. As such, the longevity of O-ring 202 and coupling element 100 can be greatly increased, and a user of coupling element 100 may experience less drag or resistance while rotating first rotation member 120.

In some embodiments, O-ring 202 may provide an additional sealing functionality, preventing the egress of any fluid at the interface between lower half 122 and upper half 124, thereby maintaining the integrity of the single internal continuous channel of coupling element 100 while still permitting the illustrated two-piece construction of first rotation member 120. As would be appreciated by one of ordinary skill in the art, a number of various mechanisms may be provided in order to provide the smooth and continuous rotation of first rotation member 120, including but not limited to, one or more ball bearings, multiple O-rings, or lubricants.

A central longitudinal bore 206 runs vertically through lower half 122 and upper half 124 of the first rotation member 120, and in some embodiments may comprise a cylindrical geometry oriented such that first axis of rotation 140 passes through a central point of longitudinal bore 206, although non-cylindrical geometries may also be employed. In some embodiments, first axis of rotation 140 may be parallel to a central axis of longitudinal bore 206. As illustrated, the central axis of longitudinal bore 206 remains the same in both lower half 122 and upper half 124, although in some embodiments, the central axis of longitudinal bore 206 may not remain the same, instead varying one or more of position and rotation with respect to vertical height along rotation member 120.

Longitudinal bore 206 forms a single continuous channel through the interior of first rotation member 120, and may be in fluid communication with male fitting 108 at one end and fluid communication with second rotation member 130 at the other end. The internal diameter of longitudinal bore 206 may be constant, or it may vary along the vertical height of first rotation member 120, in which case longitudinal bore 206 may be defined by its minimum internal diameter. As illustrated, an internal diameter of longitudinal bore 206 is less than an internal diameter of lower half 122, such that an empty section 222 is created between an inner cylindrical wall of lower half 122 and an outer cylindrical wall of longitudinal bore 206. In some embodiments, empty section 222 may be adapted to receive a corresponding section of upper half 124 in order to limit the range through which first rotation member 120 can rotate to, for example, 180 degrees. In some embodiments, a protrusion or peg (not illustrated) may extend from upper half 124 and be received in empty section 222. During rotation through the permissible range, the protrusion or peg will simply rotate through empty section 222 unimpeded. However, if rotation continues until reaching either end of the permissible range, the protrusion or peg may be designed to come into contact with a portion of empty section 222, thereby mechanically arresting the rotation movement and providing the desired limit to the range of rotation of first rotation member 120. As would be appreciated by one of ordinary skill in the art, empty section 222 may be provided in upper half 124, and a protrusion or peg may be provided in lower half 122, achieving the same functionality as described above. In some embodiments, an internal diameter of longitudinal bore 206 and first rotation member 120 may be the same, in which case various alternate mechanisms may be used to provide the desired limit to the range of rotation of first rotation member 120.

The second rotation member 130 comprises a rotatable coupling 132 between lower half 122 of the first rotation member and female fitting 102. A detailed view of female fitting 102 is provided, recalling that, in FIG. 1, female fitting 102 was obscured by protective cover 103. First end connector 104 is provided with female threads 310 along at least a portion of its interior cylindrical wall, which, although still not visible, allows female fitting 102 to couple to any correspondingly sized male threaded connector of a hose or fluid source. The internal diameter of the second end connector 106 can define a minimum internal diameter of a central longitudinal bore 216, wherein longitudinal bore 216 may extend from second end connector 106 to first end connector 104, spanning the entire length of female fitting 102. In some embodiments, the internal diameter of longitudinal bore 216 may vary along the length of female fitting 102, wherein longitudinal bore 216 is defined by its minimum internal diameter. As illustrated, longitudinal bore 216 is cylindrical in its cross section, although other geometries may be employed without diminishing the ability of coupling element 100 to convey fluids. In some embodiments, longitudinal bore 216 and longitudinal bore 206 may have the same internal diameter or, in the case of a varying internal diameter, have the same channel contour or profile. Longitudinal bore 216 can terminate at first end connector 104, such that longitudinal bore 216 is fluidly coupled to a fluid source or a hose.

In some embodiments, a coupling sleeve 220 is provided as a portion of rotatable coupling 132, wherein coupling sleeve 220 serves to protect and isolate the rotation mechanism of second rotation member 130 from any environmental factors or foreign particles. As illustrated, the rotation mechanism of second rotation member 130 is provided by a second O-ring 212, which is seated in a receiving groove 214b provided at second end connector 106 of female fitting 102, wherein both receiving groove 214b and second end connector 106 have a smaller outer diameter than first end connector 104. In some embodiments, first O-ring 202 and second O-ring 212 may be identical, regardless of whether or not first longitudinal bore 206 and second longitudinal bore 216 have the same diameter. In some embodiments, O-ring 202 and O-ring 212 may differ in one or more of their characteristics, including but not limited to diameter, width, thickness, and material type, depending on the desired performance characteristics or anticipated usage pattern. For example, in some embodiments, O-ring 212 may be expected to experience a greater degree of wear and rotation cycles in comparison to O-ring 202, and may be have its physical characteristics adjusted accordingly.

Coupling sleeve 220 may be rigidly attached at one end to lower half 122 of the first rotation member, and rotatably coupled to second end connector 106 of female fitting 102 at the other end. In some embodiments, coupling sleeve 220 may be provided integrally with lower half 122, for example via a single piece construction. A sealing member 214a may be provided along the interior cylindrical wall of coupling sleeve 220, such that O-ring 212 may be compressed between sealing member 214a and receiving groove 214b in order to enable a smooth and continuous relative rotation between lower half 122 and female fitting 102. In some embodiments, sealing member 214a may be provided at a central point along the horizontal length of coupling sleeve 220, disposed substantially halfway between the first and second open ends of coupling sleeve 220. As was the case with O-ring 202, O-ring 212 may be substantially isolated from any fluids that may be transmitted through coupling element 100, and may likewise utilize a radial compression design to ensure that O-ring 212 does not experience any tightening action as a result of rotation.

In some embodiments, O-ring 212 may provide an additional sealing functionality, preventing the egress of any fluid at the interface between lower half 122, coupling sleeve 220, and female fitting 102, thereby maintaining the integrity of the single internal continuous channel of coupling element 100 while still permitting the illustrated multi-piece construction of second rotation member 130. As would be appreciated by one of ordinary skill in the art, a number of various mechanisms may be provided in order to provide the smooth and continuous rotation of second rotation member 130, including but not limited to, one or more ball bearings, multiple O-rings, or lubricants.

Figure 3:
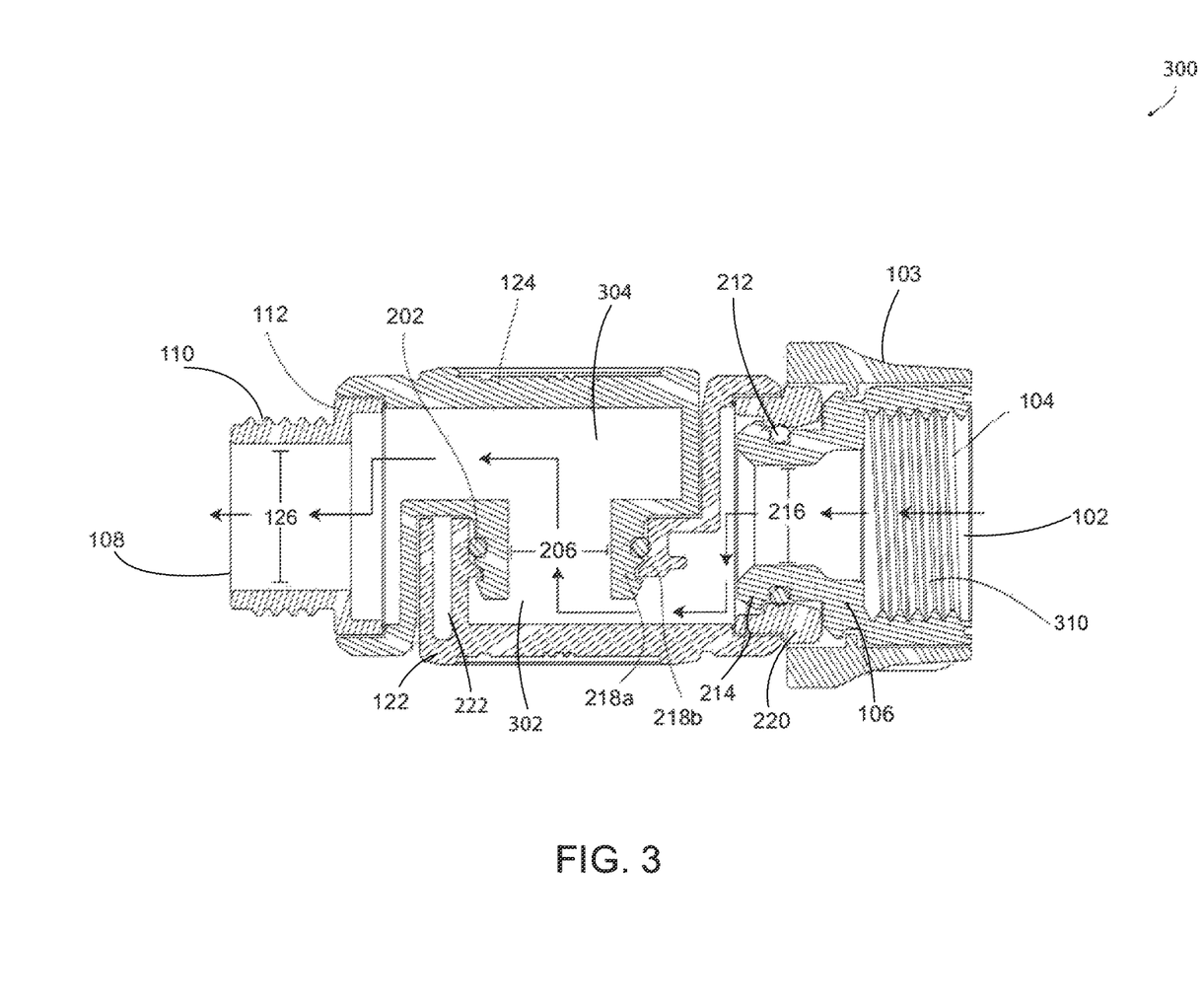
FIG. 3 is a cross-sectional side view taken along a longitudinal axis of the assembled coupling element of FIG. 1.

FIG. 3 is a cross-sectional side view 300 of exemplary coupling element 100, providing a more detailed depiction of the fluid flow path along the single continuous internal channel of coupling element 100. The following description is made with reference to a scenario in which female fitting 102 is coupled to a fluid source but applies equally to a scenario in which male fitting 108 is coupled to a fluid source.

A fluid source may be connected to coupling element 100 via the female threads of first end connector 104, thereby permitting a fluid to enter and flow through longitudinal bore 216. As illustrated, longitudinal bore 216 has a diameter that varies along the length of female fitting 102, decreasing to a minimum diameter at second end connector 106. In some embodiments, this minimum diameter is half an inch such that coupling element 100 does not restrict the flow rate of fluid from the fluid source, although other internal diameters may be employed that similarly do not lead to a restriction in flow rate. In some embodiments, a pressurized fluid source may be provided by a water tap or spigot, such as those commonly found on the side of most homes and businesses. Such water taps generally provide water at a maximum flow rate of approximately 10 gallons per minute (GPM), and with a minimum internal diameter of half an inch, coupling element 100 is able to maintain this flow rate and provide 10 gallons per minute to a connected hose. In some embodiments, coupling element 100 may be intended for use with a fluid source with a different flow rate, and the minimum internal diameter may be adjusted correspondingly in order to avoid any flow rate restriction.

From longitudinal bore 216, fluid then enters a fluid channel 302 that runs through the interior of lower half 122 of the first rotation member, with the flow path of the fluid being generally redirected downwards by approximately 90 degrees relative to the path through which it entered coupling element 100. The fluid then flows downwards until encountering the interior wall of lower half 122, at which point the flow path is redirected by another 90 degrees such that the fluid is once again traveling in the same direction in which it entered coupling element 100.

As illustrated, the fluid is then directed to an area immediately underneath longitudinal bore 206, wherein the area has a greater diameter than that of longitudinal bore 206 and may define a larger volume than longitudinal bore 206. In some embodiments, one or more dimensions of longitudinal bore 206 may be adjusted such that longitudinal bore 206 defines a larger volume than fluid channel 302. While longitudinal bore 206 is depicted as having a flat opening that is parallel to the interior wall of lower half 122 of the first rotation member, this opening may be beveled or angled to better receive the fluid flow—that is, the right hand side of the opening of longitudinal bore 206 may be higher than the left hand side, thereby increasing the effective cross-sectional area through which the fluid may enter.

Independent of the configuration of the opening of longitudinal bore 206, the fluid is ultimately redirected by a further 90 degrees, such that is urged upwards and through longitudinal bore 206 by virtue of some combination of gravity and a driving pressure provided by the fluid source. The fluid then exits longitudinal bore 206, and flows into an inner chamber 304 of upper half 124 of the first rotation member. As illustrated, inner chamber 304 defines a larger volume than that contained by longitudinal bore 206, although in some embodiments the two volumes may be adjusted such that they are equal, or such that inner chamber 304 defines a smaller volume than that contained by longitudinal bore 206.

From inner chamber 304, the fluid then flows downward, into a channel running through male fitting 108, before finally exiting coupling element 100, noting that the fluid flow may be in the same direction as that in which it entered coupling element 100. As can be appreciated from FIG. 3, the fluid travels through a single continuous internal channel—that is, at no point does the fluid flow split or otherwise diverge in multiple directions. More specifically, as illustrated, the single continuous internal channel comprises, in sequence, longitudinal bore 216, channel 302, longitudinal bore 206, inner chamber 304, and longitudinal bore 206. The use of a single internal channel makes coupling element 100 more robust in use, as the increased mechanical complexity associated with multiple fluids flows or channels may increase the likelihood of breakage, clogging, or generally inhibited performance. In some embodiments, one or both of the internal diameter and the cross sectional area of the single continuous internal channel may not be constant. In some embodiments, a minimum internal diameter of the single continuous internal channel is between 0.4 and 0.6 inches in order to prevent a reduction in flow rate relative to the flow rate of a coupled fluid source.

In an additional benefit conferred by the single continuous internal fluid channel, one or both of first rotation member 120 and second rotation member 130 can be adjusted and repositioned while fluid is flowing through coupling element 100. The single continuous internal channel serves to isolate the rotation mechanisms, implemented herein by O-rings 202 and 212, from the fluid flow, such that the fluid flow generates little to no additional resistive force resisting the rotation of either of the two rotation members. As would be appreciated by one of ordinary skill in the art, first rotation member 120 can be rotated through a full 180-degree range without having any effect on the internal diameter or configuration of both the longitudinal bore 206 and the entire single continuous internal fluid channel itself, enabled at least in part by the fact that the first axis of rotation 140 is contained within longitudinal bore 206. As such, fluid can continue to flow through coupling element 100 independently of any rotation or positioning adjustments that are made.

Similarly, second rotation member 130 may be rotated through a full 360-degree range, while fluid flows through coupling member 100, without having any effect on the internal diameter or configuration of both the longitudinal bore 216 and the entire single continuous internal fluid channel itself. In an example where female fitting 102 is rigidly coupled to a fluid source, such as a spigot, lower half 122 and its coupled components may be free to rotate 360 degrees relative to the spigot. Advantageously, when a hose is connected to the other end of coupling element 100 via male fitting 108, the hose remains free to rotate relative to the spigot—thereby eliminating any twisting forces that would have otherwise been induced. Eliminating these twisting forces can increase the longevity of the hose, as it experiences a substantially lessened degree of mechanical stress and strain, and further still, eliminating these twisting forces can largely eliminate the kinking that is so commonly experienced by hose users.

Although exemplary coupling element 100 depicts second rotation member 130 as being provided at female fitting 102 rather than being provided at male fitting 108, one of ordinary skill in the art would appreciate that second rotation member 130 could be repositioned to be provided at male fitting 108 without departing from the scope of the present disclosure, and without affecting the functionality provided by coupling element 100. That is, second rotation member 130 may comprise a rotatable coupling between fourth end connector 114 of male fitting 108, and one of lower half 122 and upper half 124 of first rotation member 120 and still achieve the same functionality outlined above. In some embodiments, a 360-degree rotation member such as second rotation member 130 may be provided at both ends of coupling element 100, such that a central portion of coupling element 100 may be substantially isolated from any rotations along the second axis of rotation 150.

Figure 4A:
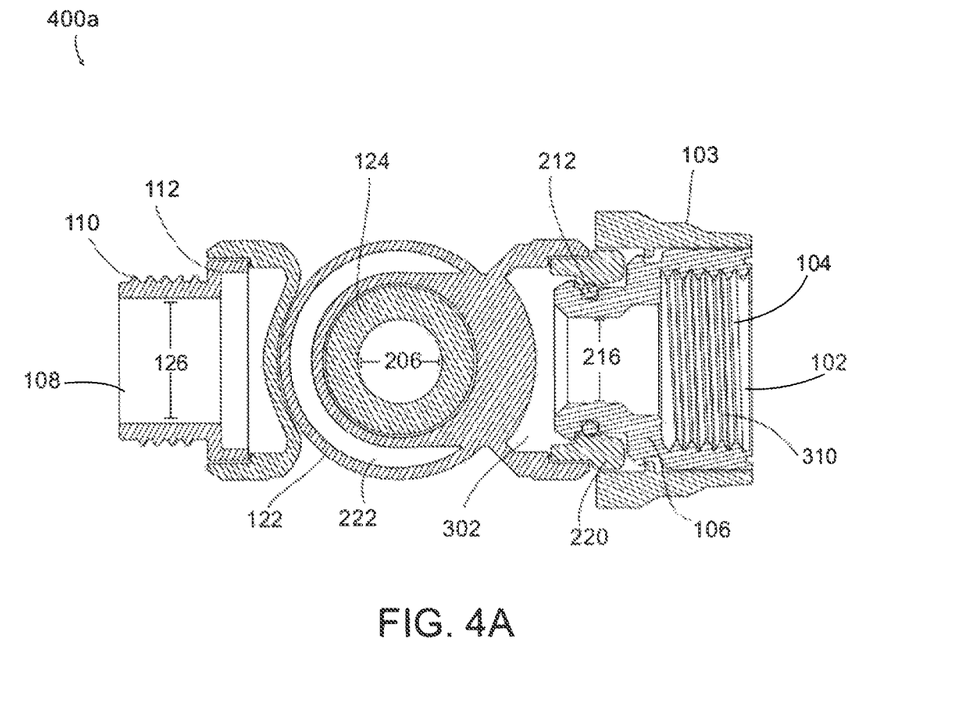
FIG. 4A is a cross-sectional top view taken along a longitudinal axis of the coupling element of FIG. 1.
Figure 4B:
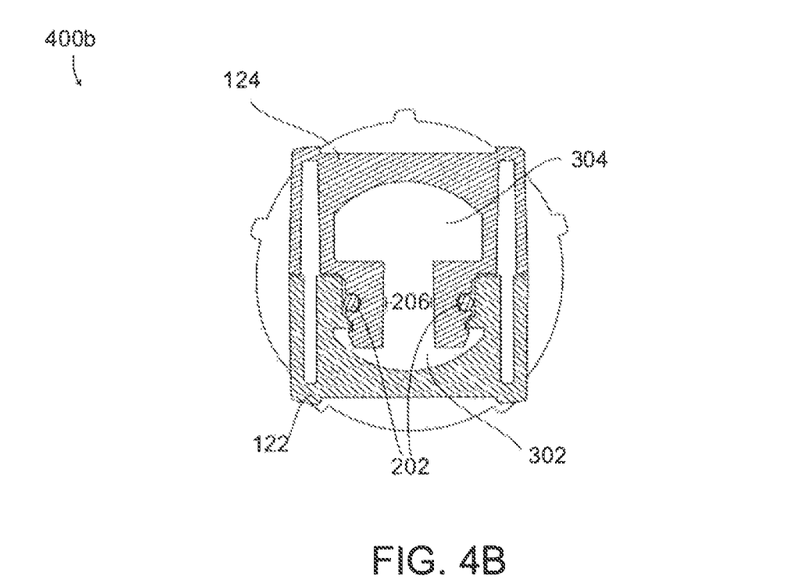
FIG. 4B is a cross-sectional view taken along a radial axis of the coupling element of FIG. 1.

FIG. 4A depicts a top down cross-sectional view 400a of exemplary coupling element 100. FIG. 4B depicts a cross-sectional view 400b taken along a longitudinal view of the single continuous internal channel of exemplary coupling element 100. Turning first to FIG. 4A, it is noted that appearance of the second rotation member 130 has remained generally unchanged in comparison to the cross-sectional view 300, which, in some embodiments, is a consequence of its radial symmetry and ability to rotate freely through 360 degrees. More particularly, the configuration and arrangement of first end connector 104, second end connector 105, protective cover 103, O-ring 212, and coupling sleeve 220 exhibit radial symmetry about one or more of the second axis of rotation 150 and a central axis of longitudinal bore 216, such that the geometric configuration of the single continuous fluid flow channel remains constant during any rotation of female fitting 102 with respect to lower half 122 and upper half 124 of the first rotation member, thereby preventing any impediment or other adjustment to the flow rate or flow characteristics through coupling element 100.

As explained previously, in general operation with female fitting 102 coupled to a fluid source, fluid travels through longitudinal bore 216, entering fluid channel 302 and flowing downwards to a location underneath longitudinal bore 206 before being forced upwards and into inner chamber 304, which is omitted from FIG. 4A in order to better illustrate an example configuration of empty section 222. As would be appreciated by one of ordinary skill in the art, inner chamber 304 may rest above empty section 222, and may further define an interior wall portion of the single continuous internal channel, providing a covering such that fluid is unable to flow into empty section 222. Fluid can thereby flow directly from longitudinal bore 206 into inner chamber 304 and through male fitting 108, avoiding empty section 222 altogether. In some embodiments, lubrication may be provided to further ensure smooth relative rotation between lower half 122 and upper half 124, in which case it may be undesirable for fluid to enter empty section 222. In some embodiments, inner chamber 304 may be designed such that it covers only a portion of empty section 222, or there may be no dividing wall provided between inner chamber 204 and empty section 222.

As discussed previously, empty section 222 can be sized to implement a desired rotational range restriction for the first rotation member 120, where, for example, a portion of upper half 124 protrudes into empty section 222 and provides a mechanical arresting force upon making contact with either of the two terminal ends of empty section 222. Although FIG. 4A depicts a configuration that may be sized to implement a rotational range restriction of 180-degrees, it is appreciated that other rotational range restrictions may be implemented, by means such as modifying the length of empty section 222, modifying an internal taper of empty section 22, or modifying a size of the protruding portion of upper half 124.

FIG. 4B illustrates how, in some embodiments, longitudinal bore 206 serves to fluidly couple inner chamber 304 and fluid channel 302 to one another. As depicted, longitudinal bore 206 defines a smaller volume than either inner chamber 304 or fluid channel 302, although this volume relationship may be varied by, for example, increasing one or more of the height and the diameter of longitudinal bore 206. As illustrated, longitudinal bore 206 is entirely contained within and defined by upper half 124 of the first rotation member, although it is appreciated that a variety of different configurations may be used to define longitudinal bore 206 while maintaining the integrity of the single continuous internal fluid channel of the present disclosure. For example, in some embodiments, longitudinal bore 206 may be entirely contained within and defined by lower half 122 of the first rotation member. In some embodiments, longitudinal bore 206 may be defined by a combination of both lower half 122 and upper half 124, wherein lower half 122 and upper half 124 each define a portion of longitudinal bore 206 and a seal is provided at the interface between lower half 122 and upper half 124 in order to prevent any fluid leaks.

Figure 5A:
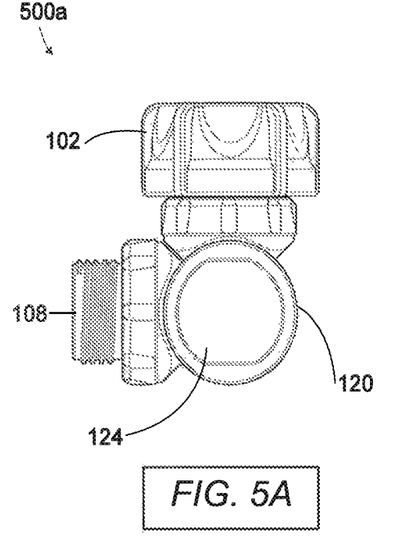
FIG. 5A is a side view of a first rotational configuration of the coupling element of FIG. 1.
Figure 5B:
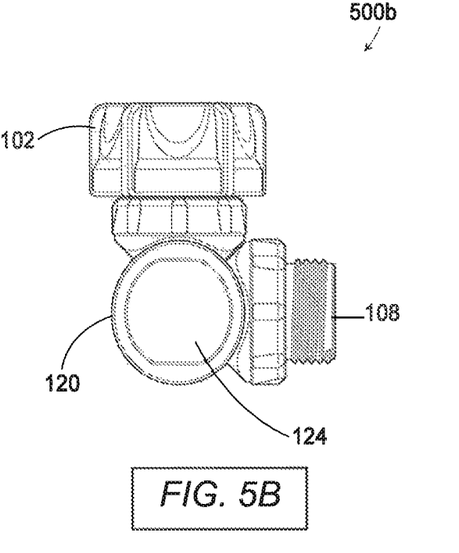
FIG. 5B is a side view of a second rotational configuration of the coupling element of FIG. 1.

FIGS. 5A-D illustrate various exemplar configurations of the present disclosure. FIGS. 5A and 5B depict an exemplary rotational range of the first rotation member 120, wherein configuration 500*a* depicts a first rotational extreme and configuration 500*b* depicts a second rotational extreme, offset by 180-degrees from the first rotational extreme of configuration 500*a*. In operation, the rotation between these two positions may be effected by a user manually grasping first rotation member 120 or male fitting 108, and exerting a force sufficient to cause rotation. In some embodiments, the force required to cause rotation is not affected by the presence of fluid flowing through coupling element 100.

The force for causing rotation between configuration 500*a* and configuration 500*b*, or anywhere in between the two configurations, may also be transmitted by a hose coupled at its first end to coupling element 100 and held by a user at some second point along the length of the hose, wherein the second point may lie anywhere between the first end of the hose and the second end of the hose. For example, a user can pull on the hose, transmitting a force sufficient to cause rotation in the direction of the user's pull. In some cases, a user may choose to walk or otherwise move with the hose in hand, causing a gradual rotation that generally acts to continuously realign the hose and coupling element 100 with the user's current position. While reference has been made throughout this description to smooth and continuous rotation, it is also possible for the rotation to be controlled or limited in a stepwise fashion, through the use of detents or other mechanisms that may provide a finite number of fixed or pre-defined rotational positions.

Figure 5C:
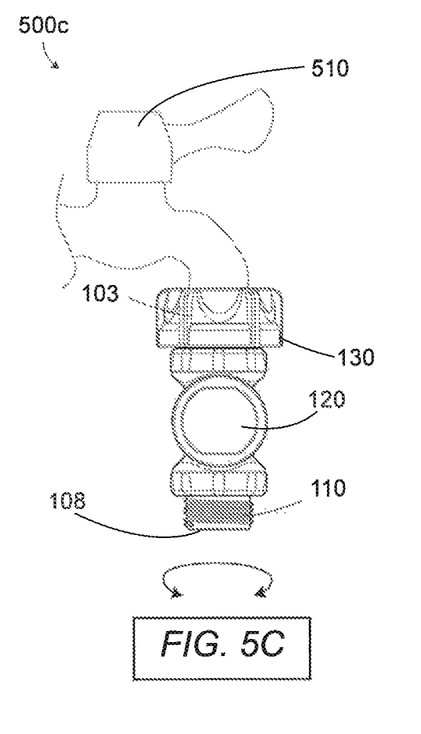
FIG. 5C is a side view of a third rotational configuration of the coupling element of FIG. 1 coupled to a fluid source.
Figure 5D:
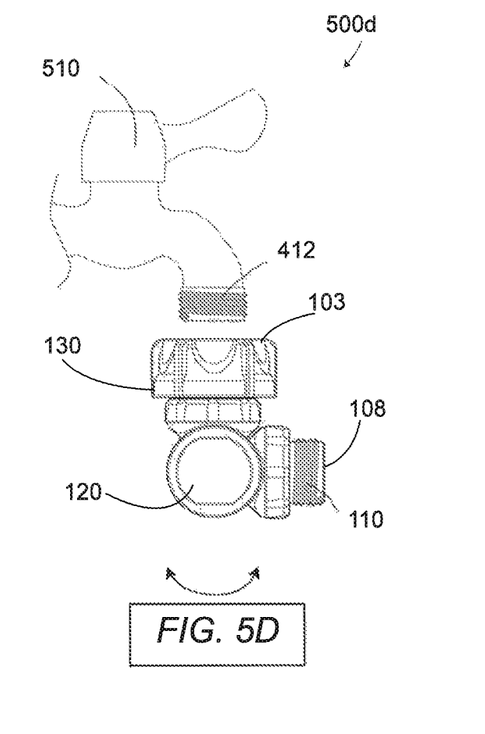
FIG. 5D is a side view of the coupling element of FIG. 1 disconnected from the fluid source and shown rotated 90 degrees.

FIGS. 5C and 5D depict an exemplary coupling between coupling element 100 and a fluid source 510, herein provided by a spigot of the type that may be found on the side of most residential and commercial properties for providing pressurized water. FIG. 5C illustrates a configuration 500*c* in which coupling element 100 has been attached to spigot 510, for example through the use of male and female threads, exemplary male threads 512 being illustrated on spigot 510 in FIG. 5D. In some embodiments, the larger diameter of protective cover 103 relative to other components of coupling element 100 may prove advantageous to a user attempting to attach or detach coupling element 100 to spigot 510, for example by providing a lever-arm and improved grip surface to confer a greater mechanical advantage to the user.

Once coupling element 100 has been attached to spigot 510, second rotation member 130 can then enable a user to effect a relative rotation between spigot 510 and a hose (not depicted) coupled to male end 108. In operation, this rotation can be effected by a user manually grasping first rotation member 120 or male fitting 108, and exerting a sufficient force. In some embodiments, this force required to cause rotation is not affected by the presence of fluid flowing through coupling element 100. In some embodiments, the force required to cause rotation is adjusted such that it falls below a threshold required to detach coupling element 100 from spigot 510, thereby preventing an accidental detachment of spigot 510 and coupling element 100.

The force for causing rotation between spigot 510 and a hose coupled to male end 108 can also be transmitted by the hose itself, wherein the hose may be held by a user at some point along the length of the hose. For example, the user may pull on the hose, or choose to walk or otherwise move with the hose in hand, creating a twisting force along the length of the hose. As would be appreciated by one of ordinary skill in the art, absent the use of the coupling element of the present disclosure, it is these twisting forces that otherwise often cause kinking and excessive tangling of hoses. Rotation mechanism 130, however, serves to eliminate or dissipate these twisting forces, allowing the hose to continuously re-orient itself relative to spigot 510, thereby maintaining a relaxed and reduced-tension state that is far less prone to kinking, tangling, and other such common issues experienced by hose users.

Reference has been made above as to how a user may separately provide a force necessary to cause a rotation of either first rotation member 120 or second rotation member 130. However, as described previously, a user can simultaneously cause a rotation of both of the rotation members 120 and 130, wherein both rotations are driven by the same underlying force. In other words, a single force may cause the hose to rotate to various positions between configuration 500*a* and 500*b* and cause the hose to rotate to various positions along a full 360-degree range defined relative to the fluid source, noting that the starting and ending configurations of such a rotation range are identical, and therefore not explicitly demarcated in FIGS. 5A and 5B. Advantageously, these two rotational degrees of rotational freedom that may be provided by exemplary coupling element 100 can permit the hose to assume a vast number of configurations relative to the fluid source. In other words, treating the fluid source as a fixed point, coupling element 100 may enable the hose to sweep through and assume any one of a set of configurations defined by a hemisphere centered at the fluid source. As such, the present disclosure can ensure that in any given scenario, a user of coupling element 100 achieves an optimal positioning of a hose relative to a fluid source, coupling element 100 serving to reduce kinking and rotational stresses induced along the length of the hose, and further acting to reduce any bending stresses that would otherwise be induced at the coupling interface between the hose and the fluid source.

Figure 6:
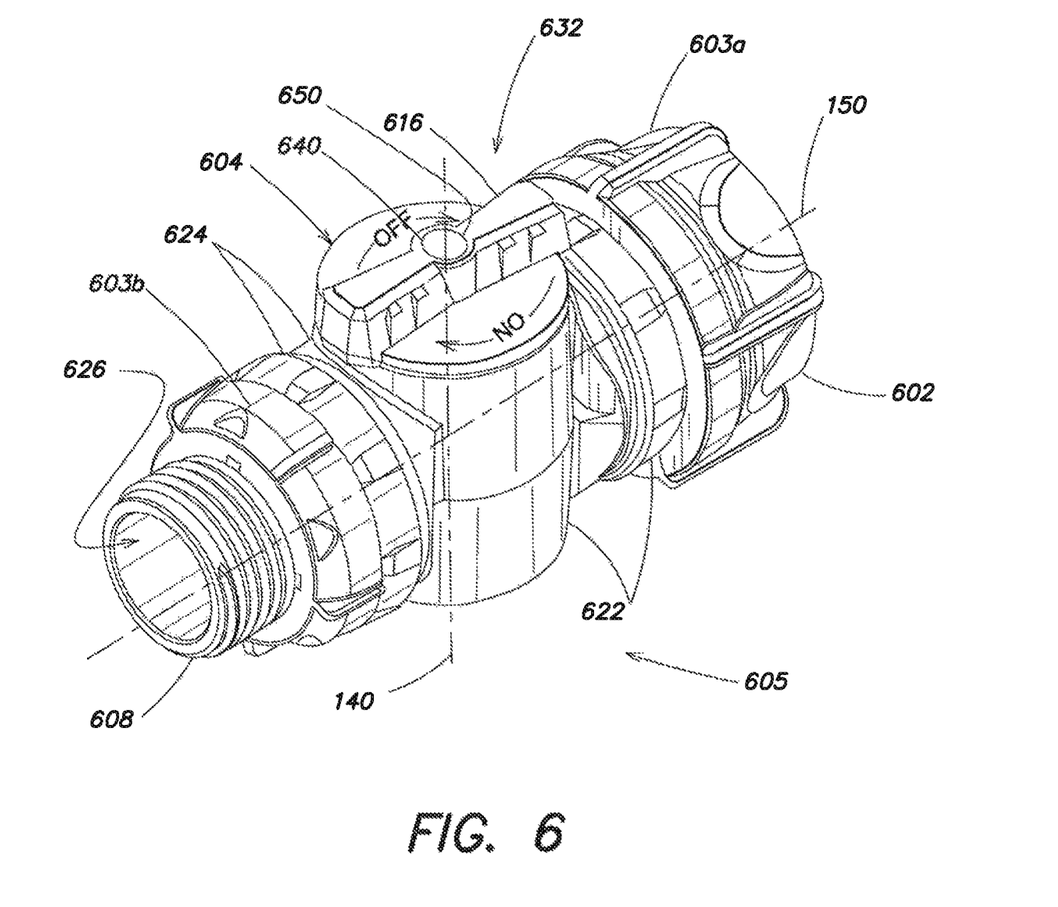
FIG. 6 is a perspective view of an assembled pipe or hose coupling element according to one embodiment of the present disclosure.
Figure 7:
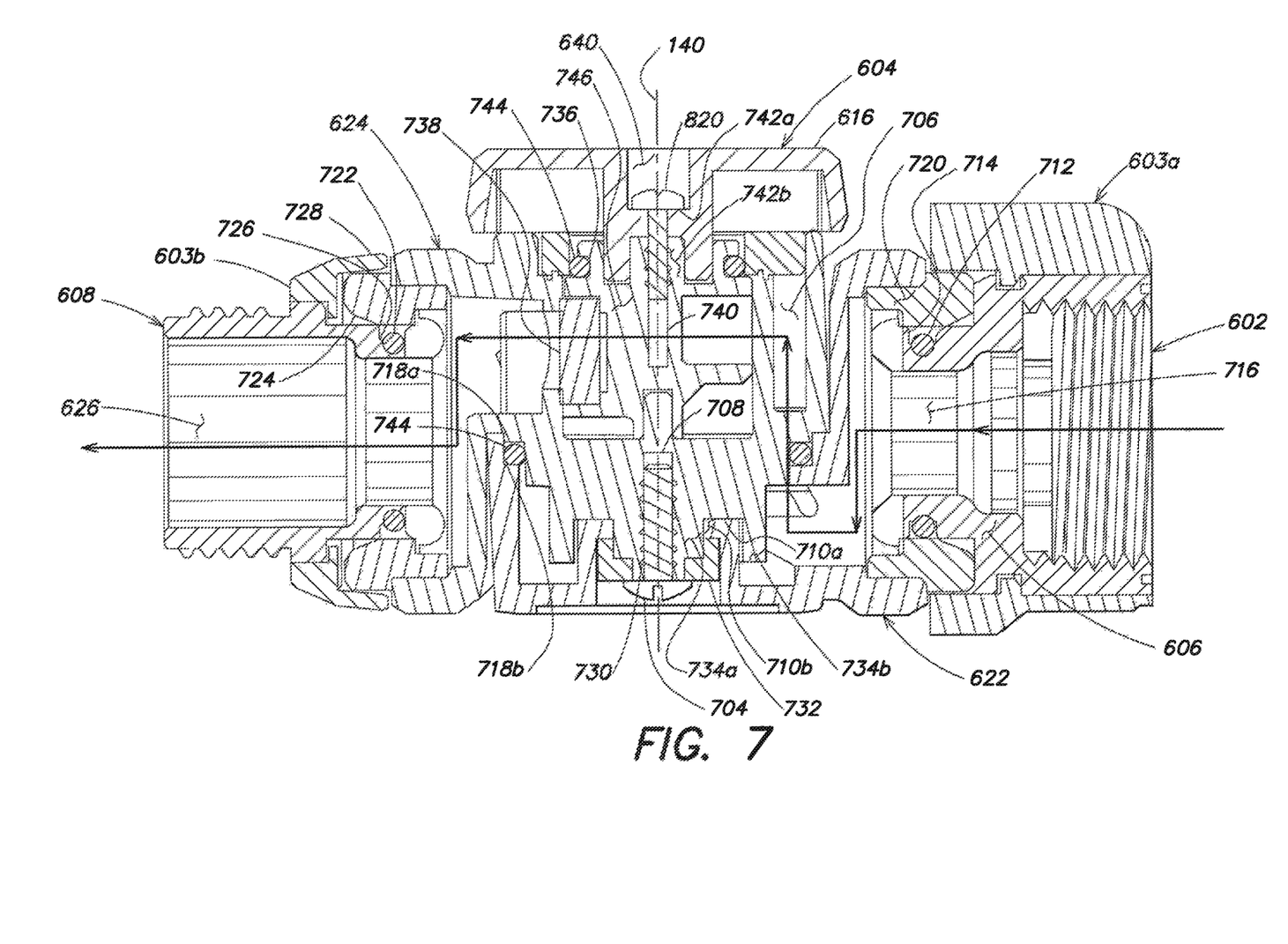
FIG. 7 is a cross-sectional side view taken along a longitudinal axis of the assembled coupling element of FIG. 6.
Figure 8:
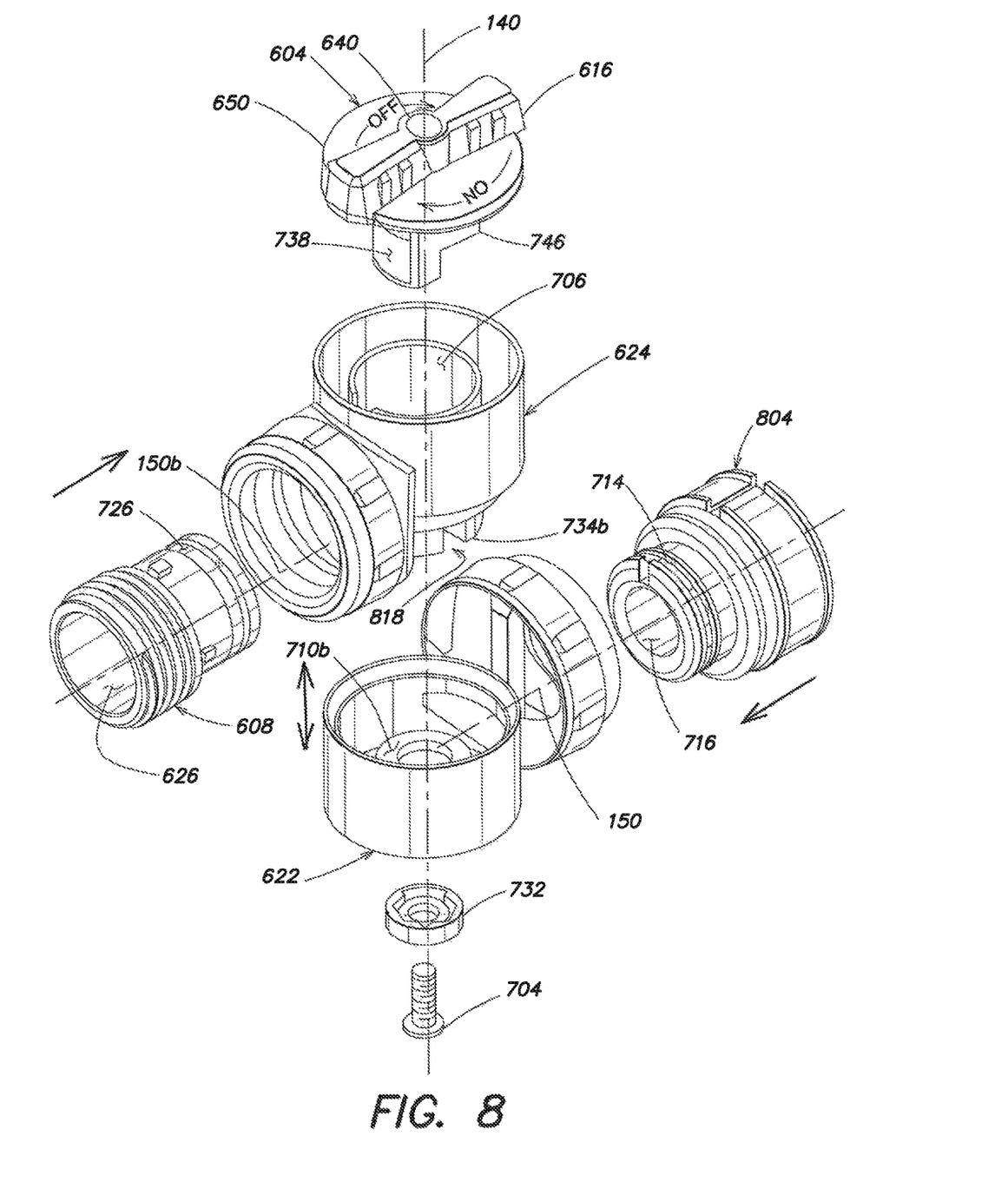
FIG. 8 is an exploded perspective view of the components of the coupling element of FIG. 6.

An embodiment 605 is depicted in FIGS. 6-8 in order to illustrate how, in some embodiments, the invention may include a switch 604 for controlling the flow of fluid through the assembled system as in FIGS. 6 and 7. As with the previously described embodiments, an upper rotatable half 624 and a lower rotatable half 622 are joined to form a rotatable coupling 632. The upper half 624 includes a male fitting 608 and the lower half 622 includes a female fitting 602, though it will be obvious to a skilled person that many other configurations including male-male, female-female, fittings not described herein, and various combinations of the aforementioned may be included in the rotatable coupling 632. In similar fashion to protective cover 103 of previously described embodiments, a protective cover 603*a* may be fit over female fitting 602. In some embodiments, a second protective cover 603b may be fit over the male fitting 608. The coupling 632 rotates about both a first transversal axis of rotation 140 and a second longitudinal axis of rotation 150. However, as is best depicted in FIG. 6, the upper half 624 may further include a switch 604 which allows a user to control the flow rate of fluid through the system without interfering with the two rotational degrees of freedom afforded by the above described assembly. The embodiment 605 may be attached to the spigot end of a hose (that is, coupled to a spigot or pressurized fluid source at one or male fitting 608 and female fitting 602, and coupled to a hose at the remaining one of male fitting 608 and female fitting 602). In some instances, the embodiment 605 may be coupled to a nozzle end of a hose, opposite from a spigot end of the hose coupled to a spigot or pressurized fluid source. In this instance, a user is provided with greater freedom of movement by way of the two rotational degrees of freedom imparted by embodiment 605, and is further provided with greater convenience by way of the switch 604 which allows the user to control the flow rate of fluid without having to return to the spigot or pressurized fluid source itself. In some instances, the embodiment 605 may be coupled, via one or male fitting 608 and female fitting 602, to a nozzle end of a hose, and coupled to a first dedicated nozzle or sprayer head at the remaining one of male fitting 608 and female fitting 602. In this manner, in addition to the advantages described above, a user is newly able to reduce or cease the flow of fluid from the spigot or pressurized fluid source via switch 604, and then swap the first dedicated nozzle or sprayer head for a second dedicated nozzle or sprayer head.

The switch 604 may be formed by a circular cap 650 and a lever 616 protruding out of the cap as illustrated by FIGS. 6 and 8. The lever is rigidly fixed to the cap and the switch may be rotated around the first axis 140 without affecting the rotational freedom of the upper rotatable half attached below. Lever 616 may be provided integrally with cap 650, for example, via single piece construction. By rotating the switch 604 in one direction, the flow of fluid through the system can be reduced or even fully blocked and by rotating the switch in the opposed direction, the flow of fluid through the system may be enabled or increased. The switch 604 is coupled to the rotatable upper half 624 by a central upper fastener 820 (described below) inserted into a depression, the depression aligned along axis 140 and located in the center of switch 604. As clear to a skilled person, other embodiments of switches and gates may be utilized to control the flow of fluid through the system and this description is in no way to be taken as a limitation. For example, but without limitation, a depressible switch could be implemented atop the rotatable upper half 624 or along a side of the lower rotatable half 622, or any other of a number of embodiments that will be apparent to one skilled in the art.

FIG. 7 depicts a lateral cross-sectional view of one embodiment of the current invention. As in the above described embodiments, a central longitudinal bore 706 runs vertically through rotatable coupling 632 and between one central horizontal longitudinal bore 716, within female fitting 602, and a second central horizontal longitudinal bore 626, within the male fitting 608. Altogether, these bores form a channel through which fluid may run, as illustrated by FIG. 7.

As depicted in FIG. 7, a lower fastener 704 joins lower half 622 and upper half 624 together to form the assembled system 605. In some embodiments, the fastener can be a clip or other forms apparent to one skilled in the art, or the structure of the two halves can be designed to accommodate each other such that they are interlocked (for example, as illustrated in the previously described embodiments). As illustrated in FIG. 7, lower fastener 704 may also be a screw joining upper half 624 to lower half 622 without impeding the rotational freedom of the two halves relative to each other. Screw 704 is aligned along transversal axis 140 and largely along the same alignment as the central upper fastener 820.

In similar fashion to the embodiments described above, a coupling sleeve 720 is rigidly attached to one end of lower half 622 and rotatably coupled to female fitting 602. An O-ring 712 is seated in a receiving groove 714, the groove provided at one end of female fitting 602. The O-ring 712 is compressed between coupling sleeve 720 and an end connector 602 of female fitting 602. Again, in similar fashion to, and without being limited by, previously described embodiments, end connector 606 couples rotation assembly 605 to female fitting 602.

An O-ring 702 is located upon a ledge 718a and is compressed between the ledge 718a and a complementary sealing member 718b. As with O-ring 202 described above, O-ring 702 may vary in characteristics from O-rings included in the respective embodiment. For example, O-ring 702 may (similarly to O-ring 202) experience a greater degree of wear and rotation cycles in comparison to O-ring 712 and so may vary in characteristics such as diameter, material construction, elasticity, and other features.

An O-ring 722 may be seated in a receiving groove 726, the receiving groove provided at one end of the male fitting 608. As illustrated in FIG. 7, O-ring 722 may be compressed between male fitting 608 and a coupling sleeve 724. Coupling sleeve 724 may be rigidly attached to upper half 624 and rotatably coupled to male fitting 608. In some embodiments, coupling sleeve 724 may be provided integrally with upper half 624, for example via a single piece construction. Protective cover 603b may cover male fitting 608 and coupling sleeve 724. Protective cover 603b may be rigidly attached to male fitting 608 and include a freely floating lip 728 extending over coupling sleeve 724 and terminating in a close seam with upper half 624. The protective cover may afford users a gripping point when attaching male fitting 608 to, for example, the female fitting of a hose, as well as protects the coupling sleeve from dust or damage. In some embodiments, protective cover 603b may be provided integrally with male fitting 608, for example, via a single piece construction.

Upper half 624 and lower half 622 may be rotatably coupled by a lower fastening screw 704 and a fastening nut 732 aligned along the first rotational axis 140. Upper half 624 may include a receiving bore 708 to receive and secure fastening screw 704. The inner walls of receiving bore 708 may include complementary threading 730 designed to accept fastening screw 704 and secure it in place. As illustrated, the head of receiving screw 704 securely couples upper half 624 and lower half 622. Fastening nut 732 may be compressed between extension 734a of upper half 624 and screw 704 to provide a rigid coupling of upper half 624 and lower fastening screw 704. A securing lip 710b may extend from lower half 622 at a transverse alignment to axis 140, the securing lip 710b seated in a lower receiving groove 710a of upper half 624. Another extension 734b may depend downwardly from the upper half 624. As depicted in FIG. 7, sealing lip 710b may be locked in place by extension 734a and nut 732 on one side and extension 734b on the opposed side.

In embodiments including a switch and flow gate mechanism, switch 604 may be coupled to a flow gate 746 by a central upper fastening screw 820 inserted through a receiving switch depression 640 centrally disposed on switch lever 616, the fastening screw 820 extending into a receiving gate depression 740. A fastening ledge 742a may extend from the sides of the receiving depression 640 in order to be compressed between the screw 820 and a fastening ledge 742b defining the receiving gate depression 740. As would be appreciated by one of ordinary skill in the art, switch 604 may be integrally coupled to flow gate 746 in various ways. As a non-limiting example, switch 604 and gate 746 may be provided via a single piece construction. Gate 746 may include a receiving groove 736 and an O-ring 744 may be seated therein. O-ring 744 may be compressed between flow gate 746 and upper half 624. In some embodiments, O-ring 744 may vary in characteristics from other O-rings included in the respective embodiment. For example, O-ring 744 may experience a greater degree of wear and rotation cycles in comparison to O-ring 712 or O-ring 702 and so may vary in diameter, construction, and other features.

Flow gate 746 extends into central longitudinal bore 706 and may include a gate panel 738 aligned largely in parallel to the vertical wall of central bore 706. Panel 738 is rigidly coupled to gate 746 and, in some embodiments, may be provided integrally with the flow gate, for example, via single-piece construction. In combination with rigidly coupling switch 604 to flow gate 746, as described above, a user may move flow panel 738 by manipulating flow switch 604. When flow switch 604 is set to one position, flow panel 738 is rotated into a position obstructing the flow of fluid from the channel formed by vertical bore 706 and into the channel formed by longitudinal bore 626. In some embodiments, the flow of fluid may be obstructed to varying degrees, allowing for finer control over the outflow of fluid from the system. In some embodiments, the flow panel may be moved into and out of obstructing position by different mechanisms than a rotating panel. For example, a spring or hydraulic system may be employed to raise the panel into obstructing position by depressing a switch, or various other mechanisms which will be clear to one skilled in the art.

FIG. 8 depicts an exploded view of an embodiment of the present invention including a rotating flow control switch 604. As with previously described embodiments, lower rotational half 622 includes female fitting 804. Fitting 804 additionally includes groove 714 in similar fashion to previously described embodiments. The groove 714 enables female fitting 804 to be rotationally coupled to lower rotational half 622. As depicted, lower half 622 includes lower fastening lip 710b and upper rotational half 624 includes extension 734b. Opposed extension 734a is not depicted here and, as described previously and best depicted in FIG. 7, combines with screw 704, nut 732, lip 710b, and extension 734b to rotationally couple lower half 622 and upper half 624. Returning to FIG. 8, extension 734b may include a fluid gate 818 in order to allow fluid in the channel formed by bore 716 to enter into the channel formed by vertical bore 706 when the two halves are coupled. Flow gate 746 includes gate panel 738 as described above and depends downwardly from switch 604. The combined switch mechanism may be inserted into vertical bore 706, forming a cap and completing the enclosure of the fluid channel.

Horizontal bore 716 is longitudinally aligned along an axis 150 in similar fashion to previously described embodiments. When the system is fully assembled, axis 150 is largely coextensive with longitudinal axis 150b. Upper half 624 may be rotationally coupled to male fitting 608 along receiving groove 726 as illustrated in FIG. 7 and described above. Note that FIG. 8 does not depict protective cover 603b (as illustrated in FIGS. 6 and 7). This is done to make clear, and without limitation, the many ways in which the embodiments of the present invention may vary.

These and other embodiments of the invention will be apparent to the skilled person and the invention is not limited to the foregoing examples.

What is claimed is:

1. A hose coupler (100) comprising:
   a female fitting (102, 602) having a first end connector (104) and a second end connector (106, 606), wherein the first end connector (104) is a female threaded end connector for attachment to a hose or a spigot;
   a male fitting (108, 608) having a third end connector (110) and a fourth end connector (112), wherein the third end connector (110) is a male threaded end connector for attachment to a hose or a spigot; and
   a rotation assembly (105, 632) coupled between the female fitting (102, 602) and the male fitting (108, 608), the rotation assembly (105) comprising:
      a first rotation member (120) rotatable about a first axis (140) of rotation and having a first longitudinal bore (216, 716) for conveying a fluid;
      a second rotation member (130) rotatable about a second axis (150) of rotation that is different from the first axis (140) of rotation and having a second longitudinal bore (206, 706) for conveying a fluid; and
      a single continuous internal channel for conveying a fluid between the female fitting (102, 602) and the male fitting (108, 608), wherein the internal channel comprises at least the first longitudinal bore (216, 716) and the second longitudinal bore (206, 706);
   wherein the rotation assembly (105, 632) is coupled to a monolithic flow control switch (604), the switch comprising:
      a rectangular flow gate (746) disposed within the single continuous internal channel; and
      a semi-cylindrically shaped gate panel (738) disposed within the single continuous internal channel, opposite from the rectangular flow gate (746) and aligned parallel to an inner face of the second longitudinal bore (206, 706), the gate panel (738) being actuatable to control the flow of fluid through the single continuous internal channel by selectively occluding the single continuous internal channel via movement of the flow control switch (604).

2. The hose coupler of claim 1 wherein the first axis (140) of rotation is perpendicular to the second axis (150) of rotation.

3. The hose coupler of claim 1 wherein the first rotation member (120) is rotatable 180 degrees about the first axis (140) of rotation.

4. The hose coupler of claim 3 wherein the first rotation member (120) comprises an upper half (124) coupled to the female fitting (102) and a lower half (122) coupled to the male fitting (108).

5. The hose coupler of claim 1 wherein the second rotation member (130) is rotatable 360 degrees about the second axis (150) of rotation.

6. The hose coupler of claim 5 wherein the second rotation member (130) comprises a rotatable coupling between the lower half (122) of the first rotation member (120) and the second end connector (106) or the fourth end connector (112).

7. The hose coupler of claim 1 wherein the internal diameter of the single continuous internal channel is between 1.016 centimeters and 1.524 centimeters.

8. The hose coupler of claim 7 wherein the internal diameter of the first longitudinal bore (216) is equal to the internal diameter of the second longitudinal bore (206).

9. The hose coupler of claim 8 wherein the first rotation member (120) and second rotation member (130) both contain at least one O-ring (202, 212), wherein a diameter of the O-ring is larger than an internal diameter of one or more of the first longitudinal bore (216) or the second longitudinal bore (206) and is oriented perpendicular to the respective first (140) or second axis (150) of rotation.

10. The hose coupler of claim 1 wherein the first axis of rotation (140) is parallel to the first longitudinal bore for conveying a fluid.

11. The hose coupler of claim 1 wherein the second axis (150) of rotation is parallel to the second longitudinal bore for conveying a fluid.

12. The hose coupler of claim 1 wherein the single continuous internal channel comprises a fluid connection between the female fitting (102), the second rotation member (130), the first rotation member (120), and the male fitting (108).

13. The hose coupler of claim 1 wherein the flow control switch (604) comprises a rotary element (616) rotatable about a third axis of rotation.

14. The hose coupler of claim 13 wherein the rotary element (616) is rotatable between an on position and an off position, the on position designating a maximal flow of fluid through the single continuous internal channel and the off position designating a minimal flow of fluid through the single continuous internal channel.

15. The hose coupler of claim 14 wherein a rate of fluid flow through the single continuous internal channel is substantially proportional to the degree of rotation of the rotary element (616) between the on and off positions.

16. The hose coupler of claim 13 wherein the third axis of rotation is parallel to the first axis (140) of rotation.

17. The hose coupler of claim 1 wherein the flow control switch (604) is coupled to the rotation assembly (632).

* * * * *